United States Patent [19]

Cheng

[11] Patent Number: 5,189,671
[45] Date of Patent: Feb. 23, 1993

[54] APPARATUS AND METHOD FOR FORMATTING VARIABLE LENGTH DATA PACKETS FOR A TRANSMISSION NETWORK

[75] Inventor: Eric M. Cheng, San Jose, Calif.

[73] Assignee: Raynet Corporation, Menlo Park, Calif.

[21] Appl. No.: 812,171

[22] Filed: Dec. 20, 1991

[51] Int. Cl.⁵ ............................................. H04J 3/26
[52] U.S. Cl. .................................. 370/94.1; 359/118; 370/94.3; 370/99
[58] Field of Search ................... 370/43, 82, 91, 94.1, 370/94.3, 99; 359/115, 118, 121

[56] References Cited

U.S. PATENT DOCUMENTS

| | | | |
|---|---|---|---|
| 4,168,469 | 9/1979 | Parikh et al. | 375/114 |
| 4,354,263 | 10/1982 | Bordry et al. | 370/94.1 |
| 4,450,554 | 5/1984 | Steensma et al. | 359/121 |
| 4,538,259 | 8/1985 | Moore | 370/60 |
| 4,603,416 | 7/1986 | Servel et al. | 370/60 |
| 4,748,618 | 5/1988 | Brown et al. | 370/94.1 |
| 4,799,219 | 1/1989 | Calvignac et al. | 370/94.1 |
| 4,858,228 | 8/1989 | Hoshi | 370/60 |
| 4,864,495 | 9/1989 | Inaba | 364/200 |
| 4,890,280 | 12/1989 | Hirata | 370/60 |
| 4,933,932 | 6/1990 | Quinquis et al. | 370/60 |
| 5,056,084 | 10/1991 | Corre | 370/99 |
| 5,058,111 | 10/1991 | Kihara et al. | 370/94.1 |

FOREIGN PATENT DOCUMENTS 8905078  6/1989  PCT Int'l Appl. .

Primary Examiner—Benedict V. Safourek
Attorney, Agent, or Firm—Dennis E. Kovach

[57] ABSTRACT

A transmit control store is provided for assembling recurrent data packets of information for transmission over an optical fiber communications network from a host digital terminal to a variable number of optical network units, wherein each optical network unit serves a variable number of individual subscriber stations, and wherein each frame contains a programmed number of optical network unit packets wherein each packet has a byte length related to the number of subscriber stations served and bandwidth required thereby. The transmit control store includes a user data buffer storage memory for storing user data bytes, a control memory for storing a control pattern for controlling the format of the packet, an overhead memory for storing packet overhead data at predetermined storage locations therein, a control byte counter for generating and simultaneously applying address values to the control memory and to the overhead memory, and decoding logic for decoding control bytes put out by the control memory to control selective data output of the user data buffer storage memory and the overhead memory. Each byte in the overhead memory has a storage which numerically corresponds to a value of its corresponding counter control byte which is used by the control memory to output the overhead memory byte from the overhead memory.

18 Claims, 8 Drawing Sheets

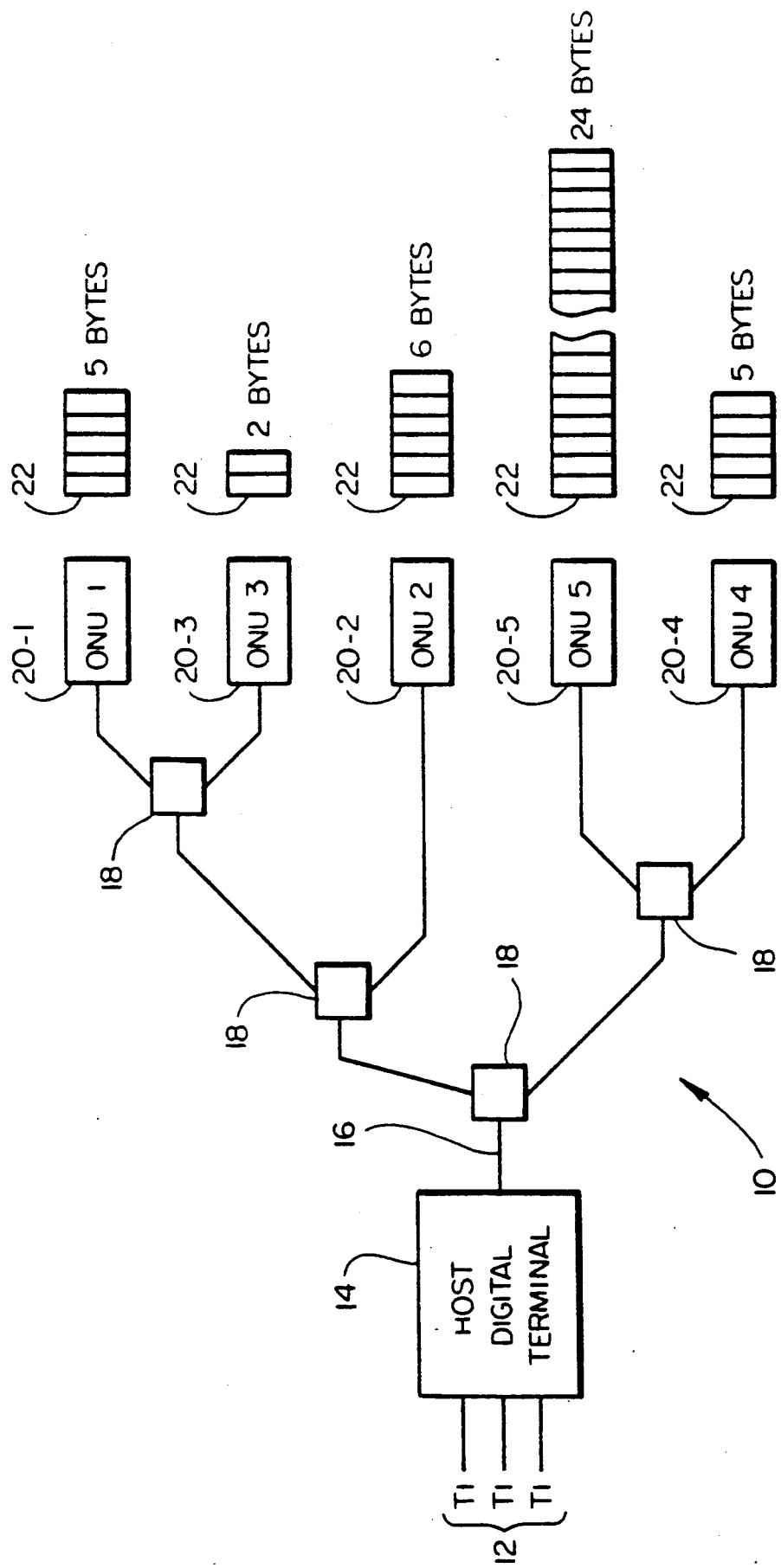
FIG_1

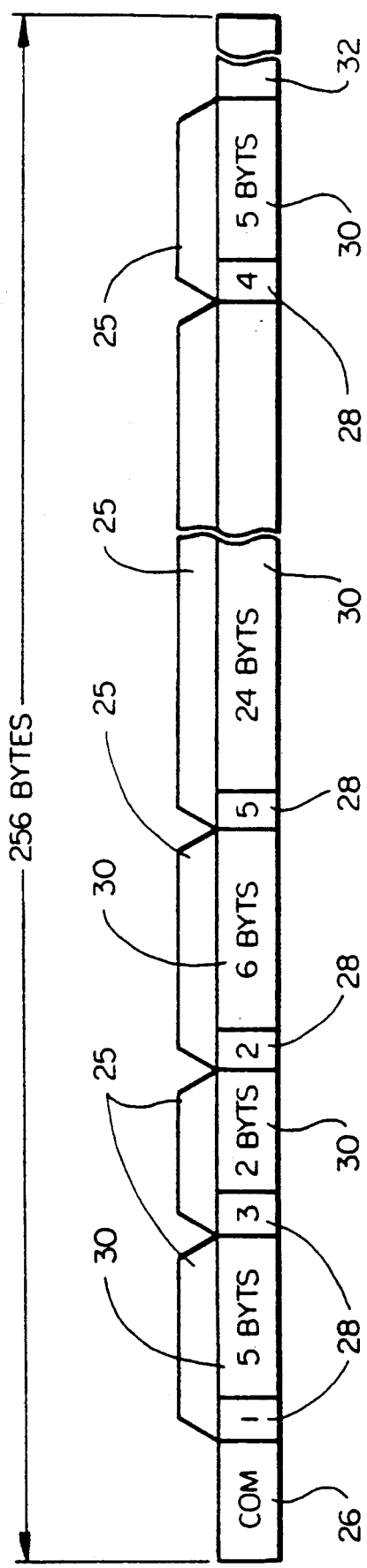
FIG_2

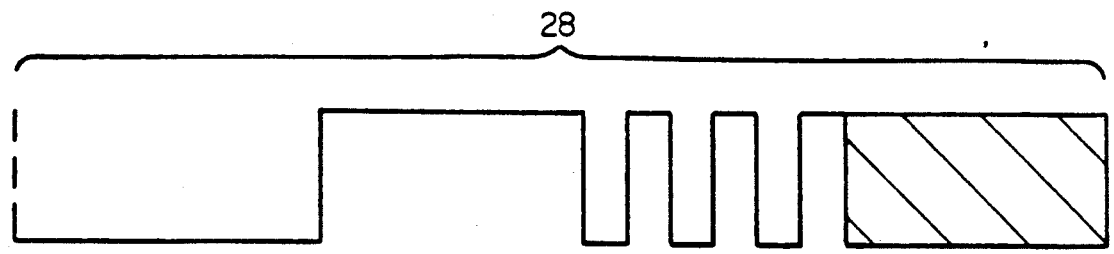
FIG_2A
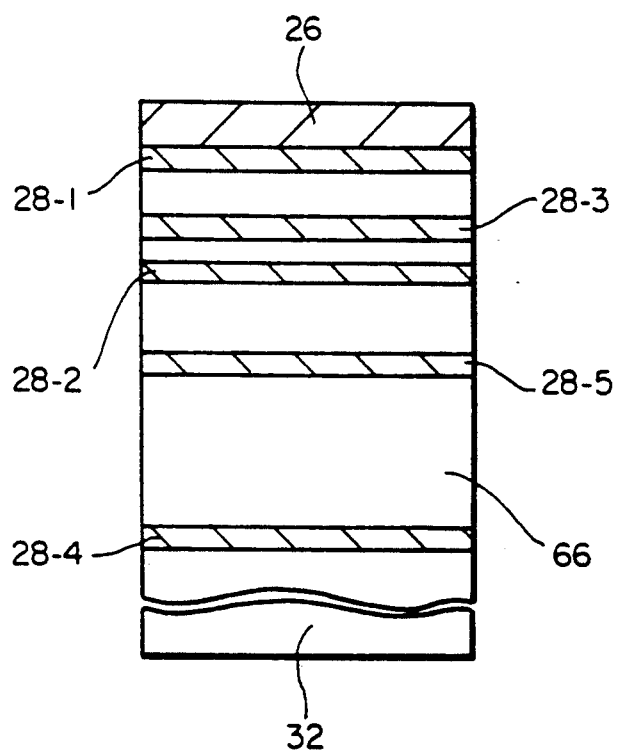
FIG_3A

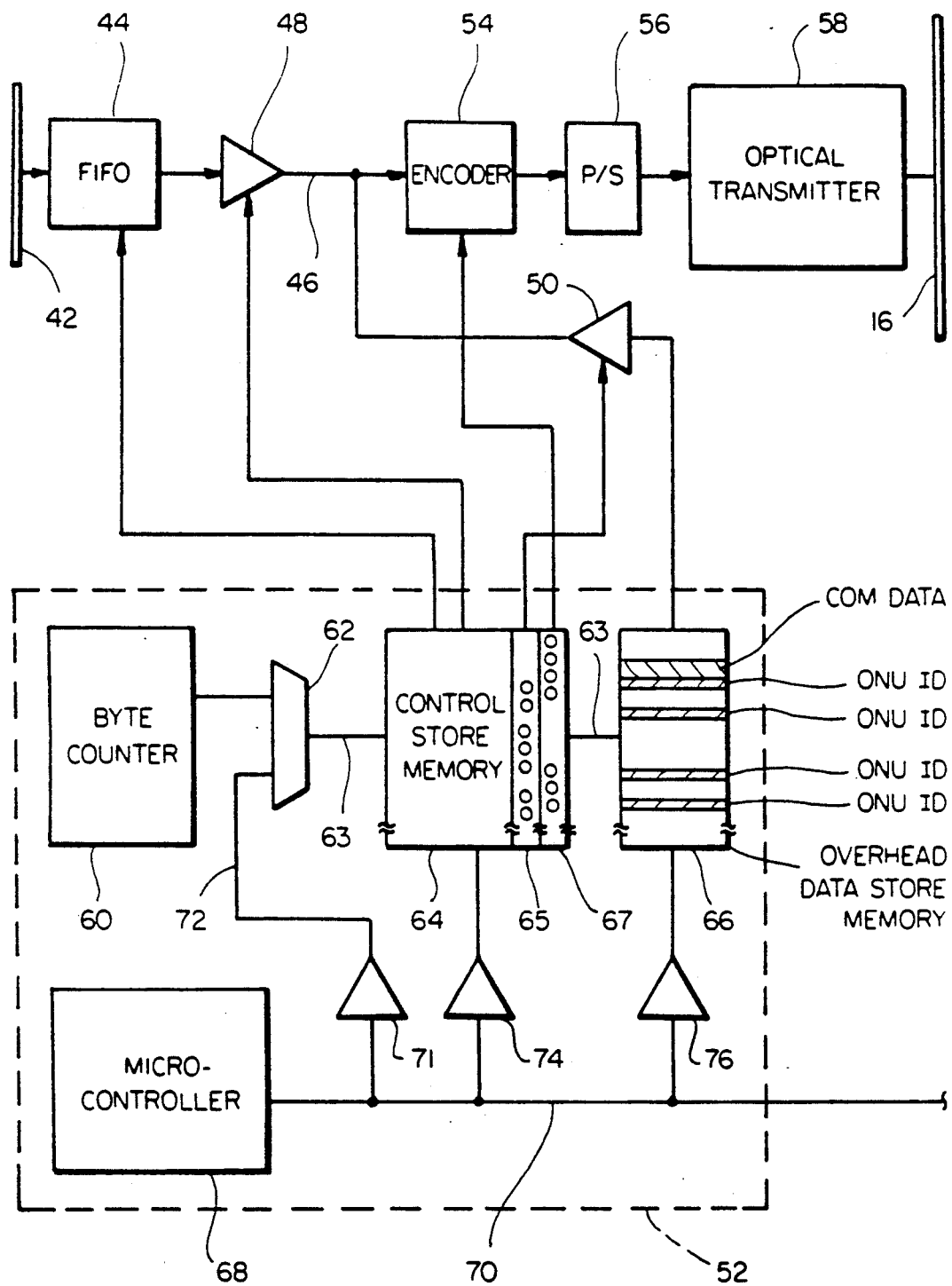
FIG_3

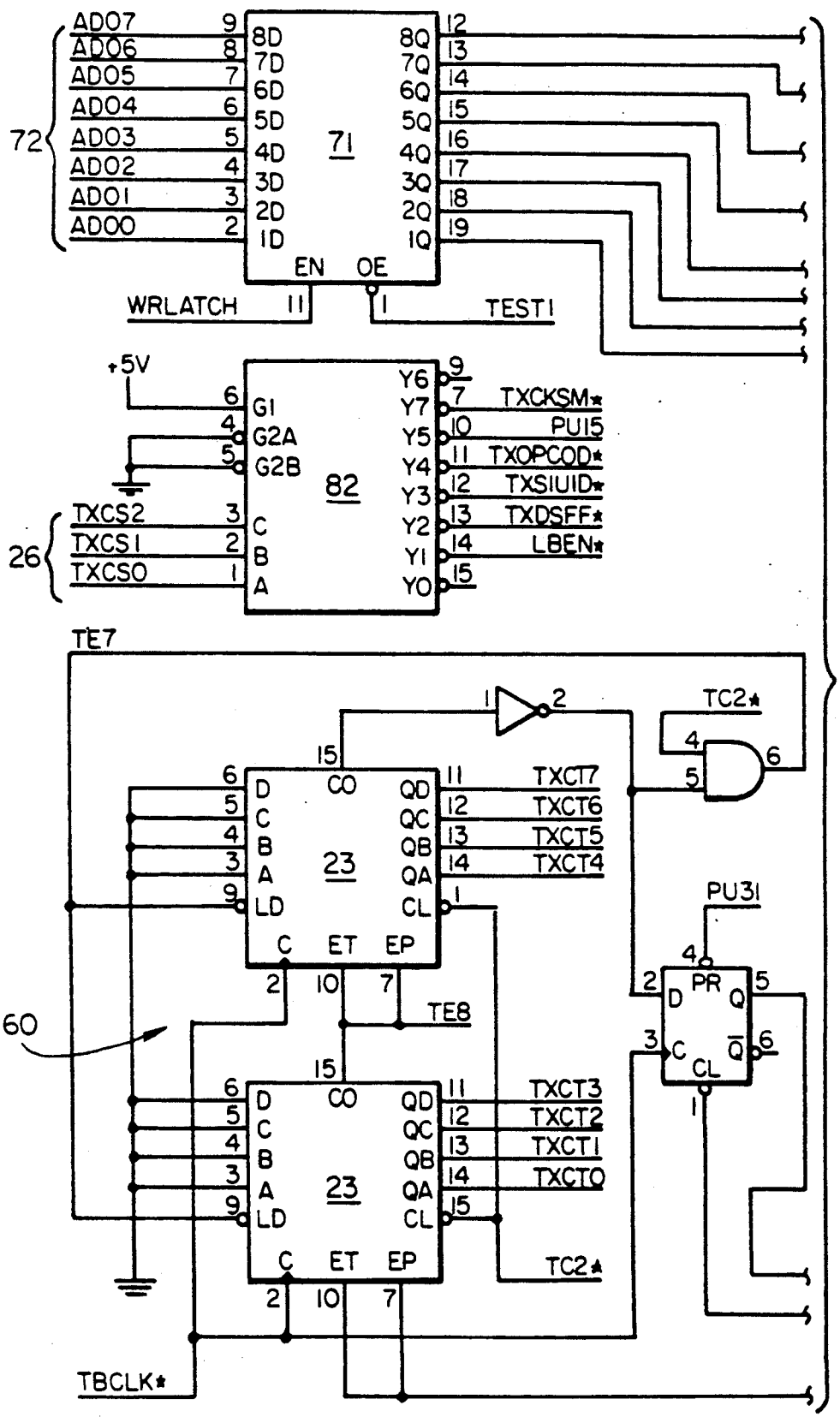
FIG_4A

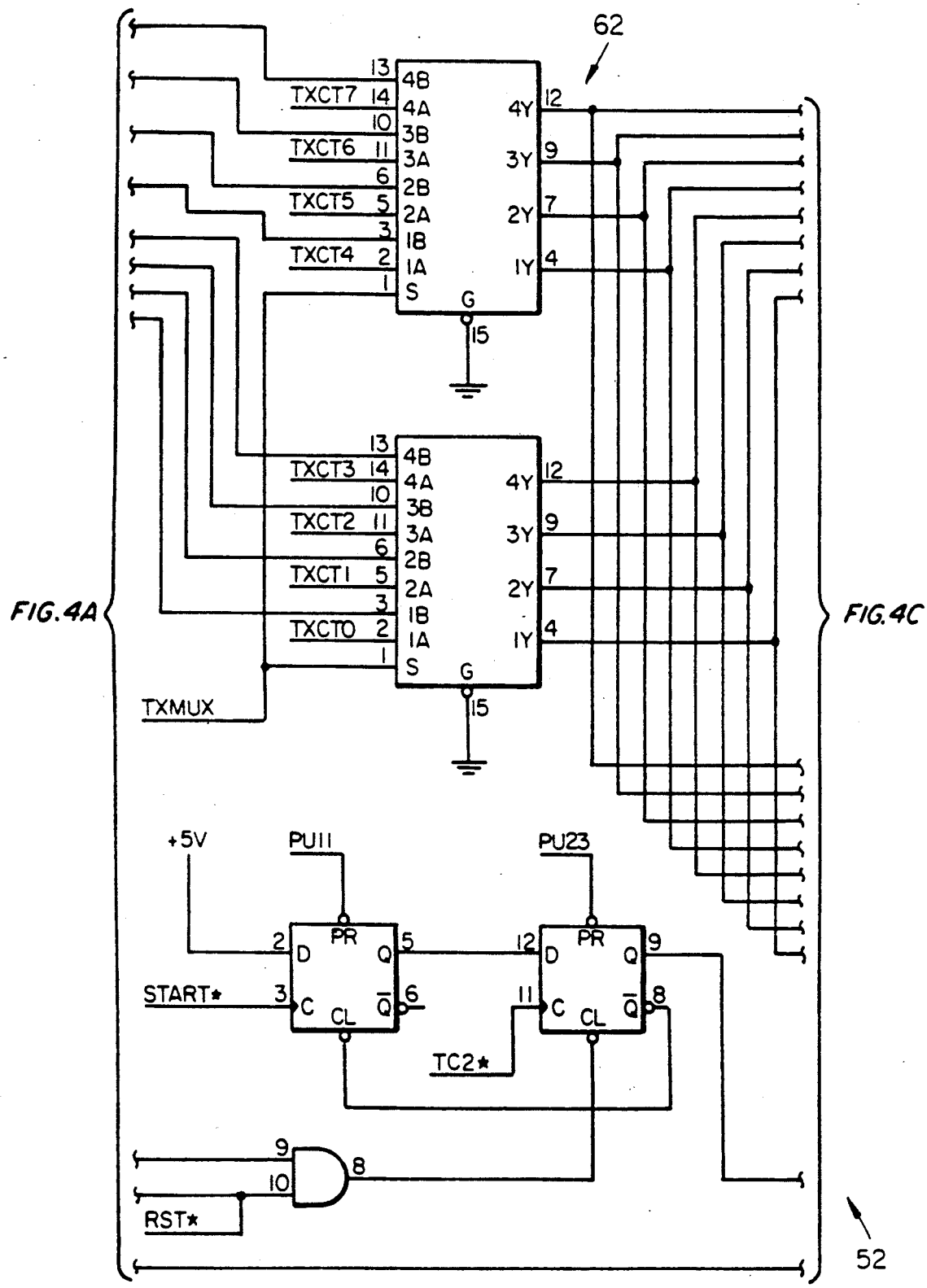
FIG_4B

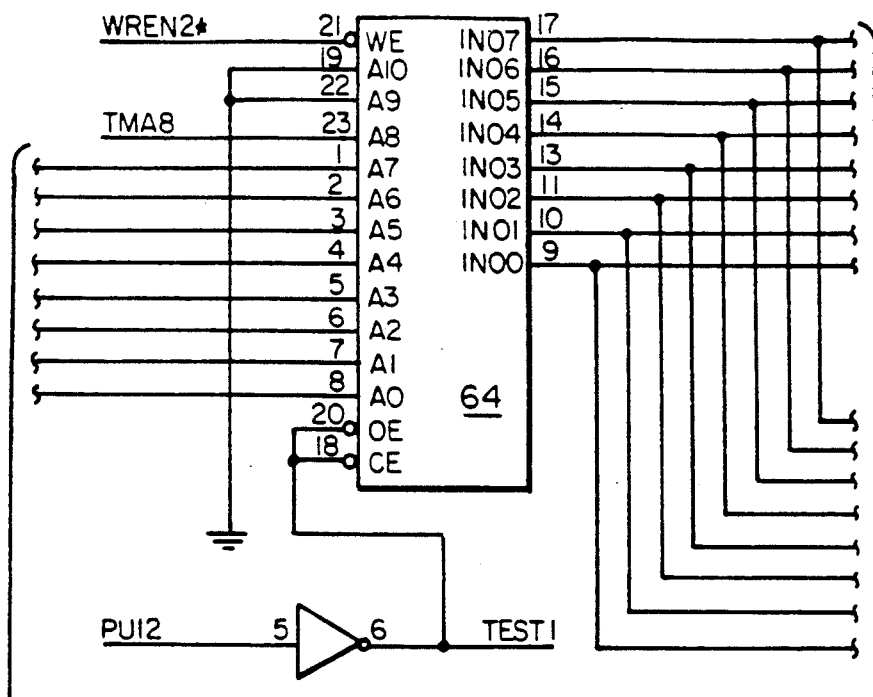
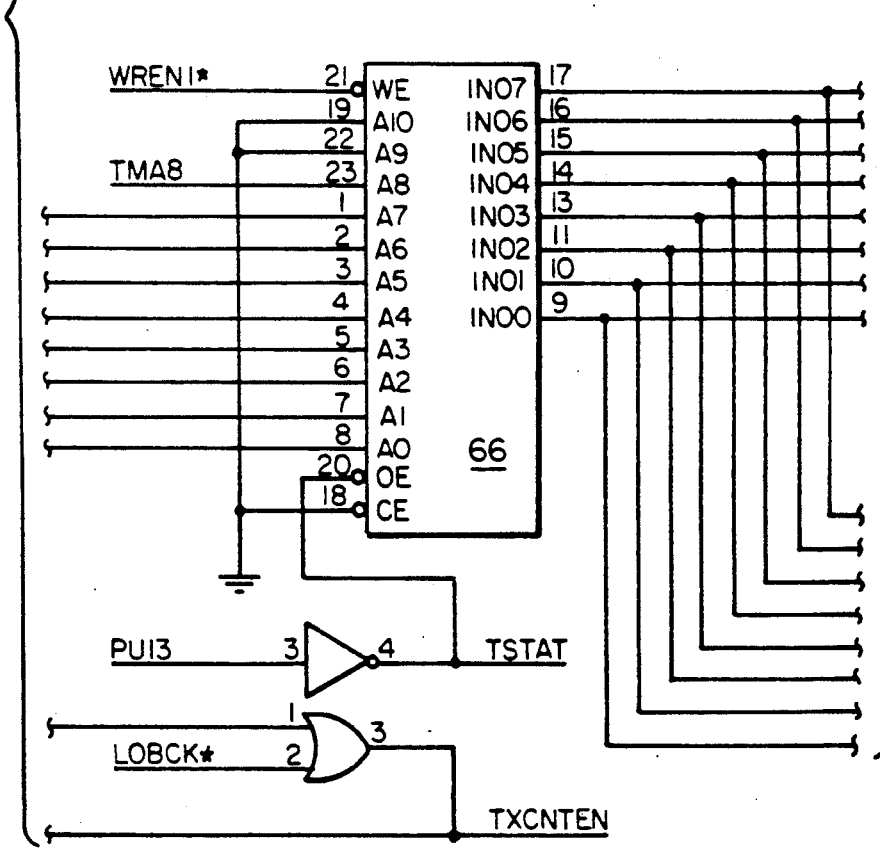
FIG_4C

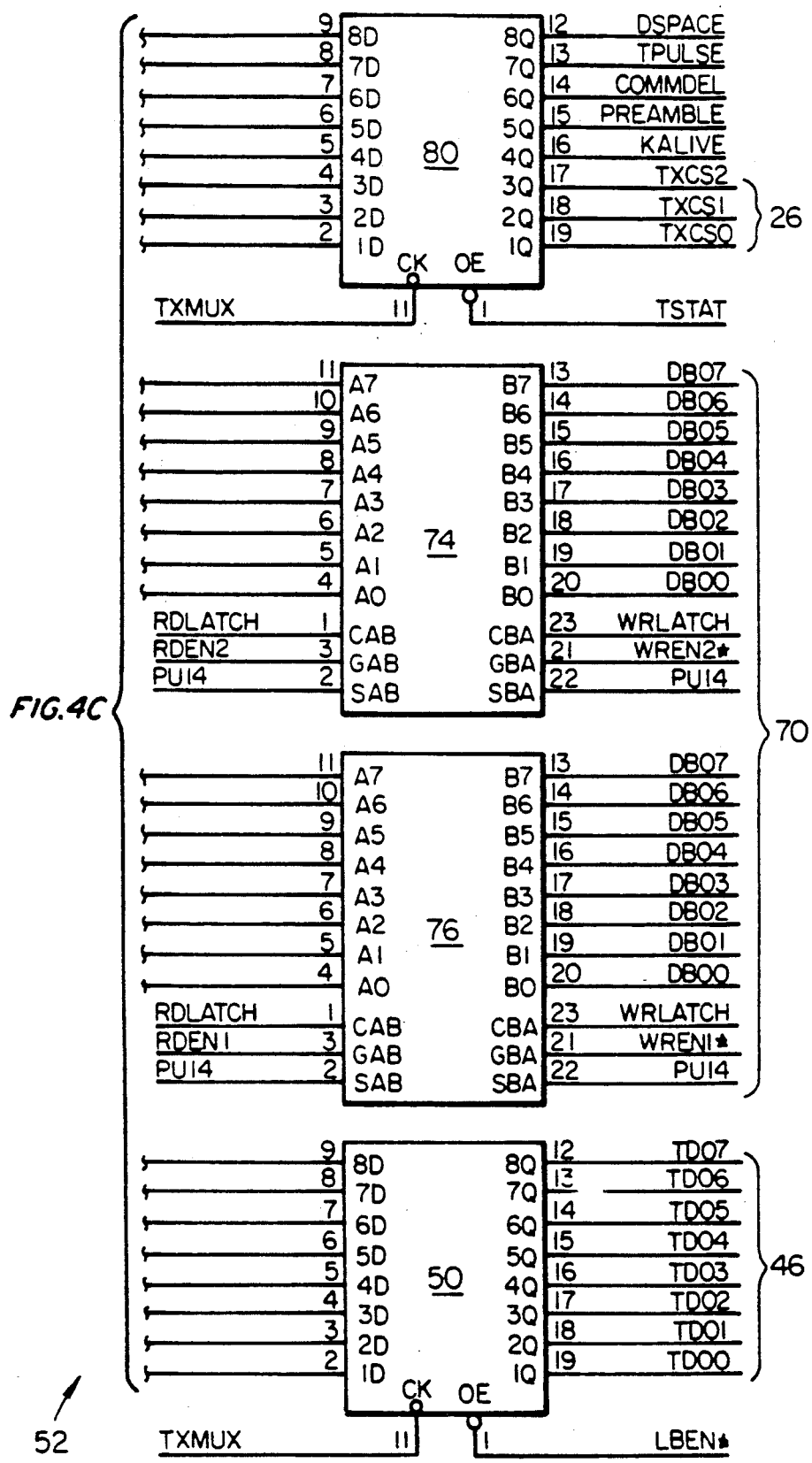
FIG_4D

APPARATUS AND METHOD FOR FORMATTING VARIABLE LENGTH DATA PACKETS FOR A TRANSMISSION NETWORK

FIELD OF THE INVENTION

The present invention relates to control apparatus and methods for controlling distribution of signal packets among nodes of an optical fiber network. More particularly, the present invention relates to a programmable transmit control store for controlling framing of variable length data packets of information for transmission from a host terminal over a network to a plurality of network units.

BACKGROUND OF THE INVENTION

In communications and data transmission it is known to assemble and transmit recurrent data frames of information from a central distribution location to a plurality of destination stations, the frames each containing a plurality of packets, each packet or group of packets having a unique destination identifier. The packets are assembled such that data following an ID identifier are received by the identified destination station, decoded and then delivered to a service subscriber's instrument.

One transmission signal format commonly encountered in conventional telephone wire systems is known as T1, which is a 24 channel time division multiplexed signal format in which each frame increment comprises a 125 microsecond interval (8 Kilohertz sampling rate). The present invention has utility in both electrical and optical transmission systems, and in systems which deliver only voice, only data, or only video information, or combinations thereof. Since a preferred embodiment of the invention is for use in optical fiber transmission systems, reference to such networks will be made throughout this description in explaining the invention though it should be understood that the invention is not limited to that single application. In modern optical fiber networks it has been decided to follow the conventional 125 microsecond frame interval for forming information frames for transmission over an optical fiber network.

Prior approaches for framing voice/data packets include synchronous and asynchronous methods. For framing synchronous transmissions, it is conventional for network units which are to receive the information to include counters which are set to zero at a beginning of a frame and count a preset number of units or bytes after the beginning of the frame to determine when bytes or packets for that particular units are to be received and decoded. With this approach, each packet does not need to have a unique destination identifier associated with it. This approach is disadvantageous since it is difficult to remotely program the network units over time to change a number of bytes each network unit is to receive. This approach is thus inefficient in terms of providing flexibility needed to adapt to changing subscriber needs and network needs, and basically requires a relatively complicated circuit implementation. For example, it is not uncommon that after a network has been operating that additional network units are added to the network, or for any network unit or any user being served thereby may require additional or less bandwidth to accommodate additional or less equipment acquired or discarded after network initialization.

To address these needs, it has also been proposed to transmit data asynchronously in packets each having a destination identifier so that any network unit can easily and efficiently determine which packets are intended for it so that packet fields for any network unit can be contracted or enlarged "on the fly". In addition, transmitting asynchronously allows each frame to optimally have a dark period during which no information is being transmitted which provides flexibility necessary when new network units are added to the network after system initialization.

Thus, a heretofore unsolved need has been for an improved and simplified method for formatting frames for distribution from a network host terminal to network units to accommodate changing network needs in a more efficient manner.

SUMMARY OF THE INVENTION

A general object of the present invention is to provide a transmit control store for controlling assembly of variable length recurrent data packets for distribution from a host terminal, preferably host digital terminal ("HDT"), to multiple network units, preferably optical network units ("ONU") in an optical fiber communications network in a manner which overcomes limitations and drawbacks of the prior art.

Another object of the present invention is to provide a transmit control store for an optical fiber network which is uncomplicated and implemented with a minimum number of readily available standard components at relatively low cost.

A further object of the present invention is to provide a transmit control store which may be reprogrammed and updated in real time in order to accommodate changes in the arrangement of the optical fiber network as subscribers are added and dropped off.

One more object of the present invention is to provide a burst packet format and transmit control store for assembling the burst packet such that the number of user bytes allocated to a particular ONU may be variable within each packet, thereby enabling packet bandwidth to be optimized to subscriber service requirements without requiring filler bytes for each ONU in order to meet expected future service requirements.

According to a first facet of the invention, what is disclosed is a method of forming and transmitting recurrent information frames from a host terminal to a plurality of network units so that the frames can programmably be reformatted from frame to frame so as to allow a number of packets contained therein to change and so as to allow a number of bytes contained within any packet to change, comprising the steps of:

storing user data bytes to be received by the network units in a user data buffer memory means;

storing packet ID identifiers for the network units in an overhead memory means at first address storage locations spaced apart within the overhead memory means so that each network unit packet identifier is stored in a storage location which numerically conicides with its corresponding numeric frame byte location where each packet identifier is to be located in the frame, the overhead memory means having a number of storage locations at least as large as a number of byte locations in the information frame;

storing a control pattern for sequentially controlling a format of the information frame in a control memory means such that the resultant information frame includes the user data bytes and the packet identifiers in a predetermined order, the control memory means having a number of addresses at least as large as a number of byte locations in the information frame;

generating and simultaneously applying sequential address values to the control memory means and the overhead memory means; and sequentially outputting control bytes from the control memory means in accordance with each sequential address value to control selective data output of the user data buffer memory means and the overhead memory means whereby each byte obtained from the overhead memory means is from a sequential address location corresponding to the sequential address value which generated its associated control byte so that a said network unit packet identifier and data bytes for said unit are arranged within each frame in accordance with the frame control pattern stored in the control memory means.

As one aspect of this facet of the invention, the step of generating and simultaneously applying address values to the control memory is carried out by generating sequential byte count values with a single byte counter.

As another aspect of this facet of the invention, the packet comprises n bytes of information and the highest number of sequential address values is n, (for example n=256).

As a further aspect of this facet of the invention, the step of storing packet overhead data in the overhead data memory comprises storing at least system communications values and optical network unit identification values.

As one more aspect of this facet of the present invention, the step of storing a control pattern for controlling the format of the data frame in the control memory comprises the step of writing a control value for each count such that the value selects a data output from either the user data buffer, the overhead data memory, a filler byte generator, or a clock acquisition byte generator.

Another facet of the invention is to provide a host terminal for assembling recurrent packets within recurrent data frames of information for transmission over a network from the host terminal to a variable number of network units, wherein each frame contains a programmed number of network unit packets which can vary from frame to frame, wherein each packet has a variable byte length which can change from frame to frame related to an amount of bandwidth required by each network unit, comprising:

user data buffer storage means for storing user data bytes, control memory means for storing a control pattern for controlling a format of the frames, the control memory means having a number of addresses at least as large as a number of bytes in the information frame, overhead memory means for storing frame overhead information at predetermined storage locations therein, the overhead memory means having a number of addresses at least as large as a number of bytes in the information frame, at least some of the frame overhead information comprising packet ID identifiers which are stored at numeric address locations within the overhead memory means so as to be sequentially spaced apart and so as to numerically coincide with frame address locations where each such packet ID identifier is to be located in the frame, control byte counter means for generating and simultaneously applying sequential numeric address values to the control memory means and the overhead memory means, and decoding logic means for decoding control bytes put out by the control memory means to control selective data output of the user data buffer storage means and the overhead memory means whereby each byte obtained from the overhead memory means is from a sequential address location corresponding to the sequential address value which generated its associated control byte so as to construct frames in accordance with the control pattern stored in the control memory means.

As one aspect of this facet of the invention, the packet overhead data memory has the same number of addresses as the control memory.

As another aspect of this facet of the invention, the control memory and the overhead data memory comprise semiconductor static random access memory arrays each arranged as a plurality of separately addressable pages, whereby one set of pages may be read while another set of pages is being written.

As a further aspect of this facet of the invention, the host terminal further includes writing circuitry for writing the control pattern in the control memory, and for writing the packet overhead data in the overhead data memory. As a related aspect of this facet of the invention, the writing circuitry is capable of writing to a selected one of the control memory and the overhead data memory between counts of the control byte counter.

As yet one more aspect of this facet of the invention, the writing circuitry includes a digital microcontroller selectively connectable to write values to the control memory and to the overhead data memory via an address bus for providing addresses and via a data bus for providing values to the control memory and to the overhead data memory. As a related aspect, an address multiplexer is provided for selecting between the control byte counter and the address bus of the microcontroller.

As yet one more aspect of this facet of the invention, the control byte counter comprises a counter arranged to put out sequential count values corresponding in number to the number of separate information groups included within the packet, such as 256 values or bytes.

These and other objects, advantages, aspects and features of the present invention will be more fully understood and appreciated upon consideration of the following detailed description of preferred embodiments, presented in conjunction with the accompanying drawings.

BRIEF DESCRIPTION OF THE DRAWINGS

FIG. 1 illustrates an optical fiber network including an HDT servicing a plurality of ONUs via an optical fiber cable and a plurality of optical splitters/combiners along the fiber cable.

FIG. 2 illustrates a programmable arrangement of a frame assembled by a transmit control store of the FIG. 1 optical fiber distribution network, in accordance with principles of the present invention.

FIG. 2A graphs the format of an ONU data header within the FIG. 2 packet.

FIG. 3 is a simplified block diagram of a transmit control store incorporating principles of the present invention.

FIG. 3A is an exemplary, programmable memory map for a overhead data store memory of the FIG. 3 transmit control store circuit, based upon the FIG. 2 packet format.

FIGS. 4A-4D are more detailed block diagrams of key elements of the FIG. 3 transmit control store circuit, showing electrical implementation and interconnection of the illustrated elements.

DETAILED DESCRIPTION OF THE PREFERRED EMBODIMENT

FIG. 1 illustrates in simplified overview of an optical fiber network 10 of the type presently encountered in practice. In this example, fiber 16 supports bidirectional traffic. If desired, another fiber 16 and set of associated splitter/combiners 18 could be utilized, one for outgoing traffic and the other for incoming traffic. In either case, outgoing traffic flows from a host digital terminal ("HDT") 14 to a plurality of optical network units ("ONU") 20 supported by the particular HDT. Also, the method and circuitry for switching incoming data information bits, groups or bytes in order to route them to their respective intended destinations is not described as such a description is not necessary for an understanding of the present invention.

The network 10 receives a plurality of incoming signal channels 12, such as T1 carrier channels with each providing several individual signals (e.g. 24 for T1). According to a preferred embodiment, each signal represents 8 bits or 1 byte. While the expression "byte" is used herein in a conventional sense meaning an eight binary bit word, the term ("byte") should be understood in a broad sense as representing any conveniently sized parallel arrangement of bits to form an information group or a data word. These channels 12 enter the HDT 14 which formats the individual signals into recurrent packets 24 of voice or data information, and then modulates a laser beam with the packet information and transmits the modulated light energy over an optical fiber cable 16. The fiber cable network 16 typically extends through a plurality of optical signal splitters 18, and eventually reaches each one of the plurality of ONUs 20. Each ONU 20 has a unique identification number assigned to it, and each ONU 20 may accommodate any number of desired service subscribers, i.e. 4, 8, 24, etc. and any number of data corresponding bytes. In FIG. 1 five ONUs are illustrated. Each ONU 20 receives recurrent packets from the HDT via the fiber 16.

As shown in FIG. 2, each frame contains a predetermined number of bytes and preferably is a burst of 125 microseconds duration thereby achieving a band frequency of 8 kHz. Each service subscriber station actually connected to an ONU 20 is preferably provided with a single data byte 22 within a particular packet or optionally a predetermined number of bytes 22 when additional bandwidth is desired by the service station. In this example the subscriber service station user byte(s) is determined by its order within the user bytes arranged in the user byte field 30 immediately following the ONU ID field 28 of the ONU 20 servicing the particular subscriber station. At a frame repetition frequency of 8,000 frames per second, each subscriber will thus receive a minimum of 8,000 bytes of information per second during network usage periods when the service station uses only 1 byte per frame.

As shown in FIG. 1, ONU 20-1 presently receives 5 data bytes and can thus serve up to five service subscribers, and is therefore allotted 5 bytes of user information following its header which includes an ONU ID field within each frame from the HDT 14. ONU 20-2 presently is allotted 6 user data bytes. ONU 20-3 receives 2 user data bytes. ONU 20-4 now serves five subscribers and receives 5 user data bytes. ONU 20-5 receives 24 user data bytes. It will be appreciated by those skilled in the art that the physical locations of the ONUs 20 may be widely separated, and that the number of service subscribers served per ONU will vary from time to time as will the number of bytes required by each service subscriber, in accordance with customer requirements and requests for service. Thus, a principal requirement is that the network 10 may be quickly and easily reprogrammed in order to adapt itself to changing customer needs and service requirements.

FIG. 2 illustrates an exemplary fixed length data frame 24 as arranged and put out by the HDT 14 to the ONUs 20 of the network 10. A communications field 26 is devoted to providing broadcast communications applicable to all of the ONUs 20 individually or as a group, and all of the ONUs 20 monitor and decode the information (or at least a destination identifier) contained in the communications field 26. The communications field 26 is preferably 13 bytes in length or any other desired length depending on network requirements, and preferably begins with a unique header or frame marker identifying the beginning of the frame 24. Following the communications field 26 are a series of ONU fields or packets 25. In accordance with the present invention, these packets 25 may be arranged in any order and may range in minimum length of one user data byte to any desired maximum number of user data bytes. Overhead bytes are also included for each packet 25 for acquiring clock, for identifying the intended ONU, for signaling, for checking for errors, etc. According to a preferred embodiment, each ONU packet transmitted by the HDT contains 4 clock acquisition overhead bytes.

In general, each ONU packet 25 includes a clock acquisition preamble followed by a packet ID identifier, both included in ID header portion 28 followed by a user data portion 30 comprising a number of preset user data bytes supported by the identified ONU 20. In the FIG. 2 example, the lineal arrangement of ONU packets 25 within the frame 24 follows the top-down physical arrangement shown in FIG. 1. However, the particular arrangement or order of the ONU packets within the frame 24 may vary from frame to frame as desired by the HDT. Each ONU ID portion 28 and associated data portion 30 occupy only the space (or time period) needed within the frame 24, depending upon present service subscriber requirements. Thus, each frame 24 is optimized, without any filler bytes being provided within any ONU packet 25. If filler bytes are required or preferred to fill up an unused portion of the frame, a filler byte field 32 is preferably placed in the frame 24, preferably at the end of the last ONU packet and completes the 125 microsecond frame.

As illustrated by FIG. 2A, each ONU header portion 28 begins with a unique header clock acquisition marking pattern which will not result from valid encoding of user data. In the FIG. 2A example the clock acquisition marking pattern is four bytes long: the first byte being all zeros, the second byte being all ones, and the third and fourth bytes comprising an alternating pattern of ones and zeros to provide phase lock training pulses for the ONUs. The ONU packet ID identifier follows and comprises the ONU's unique identification number, and signaling information follows the packet ID identifier. If desired, an error check sum byte could be provided after the ONU user data bytes. All of the ONUs monitor the data stream flowing out over the fiber network 16 from the HDT, and all decode and check each successive ONU identification number or ONU packet ID identifier. The particular ONU 20 identified by the presently received ONU identification number captures and distributes the data bytes in the immediately following user data field 30 to its respective service subscriber stations. Since each ONU 20 only receives user bytes for the subscriber stations presently being supported, a greater number of ONUs 20 may be supported by a particular HDT 14 than if each ONU 20 were allocated a fixed number of user bytes set at the highest possible station support level, e.g. 24 stations.

Turning now to FIG. 3, the HDT 14 includes a transmit section and a receive section (not shown). The transmit section includes an internal electrical data bus 42 for receiving digital information bytes comprising voice, data, or video information intended for distribution to the service subscriber stations connected to the ONUs 20 of the network 10. These user data bytes are loaded into a first-in, first-out (FIFO) buffer memory array 44, and later put out over a path 46. A gate 48 selectively opens the path 46 during formation of each frame 24, while communications data bytes and ONU packet ID identifier bytes are being supplied via a gate 50 from a transmit control store circuit 52 in accordance with the present invention. The stream of bytes on the path 46 is then encoded within an encoder 54. The encoder 54 scrambles the bits in each byte so as to achieve a desirable zero and one bit density in a resultant serial data stream. A conventional 4B5B (8B10B) encoding scheme is presently preferred. The scrambled data stream is then converted from parallel format into a serial by bit data stream format by a parallel to serial converter 56 and then applied to modulate a coherent light beam (laser beam) generated by an optical transmitter 58. The modulated light beam from the transmitter 58 is then put out over the fiber cable network 16.

According to a preferred embodiment, the encoder is provided with means for inserting "standardized" bytes into the frame at appropriate locations as instructed by the control store memory 64. In particular, such bytes preferably include the clock acquisition bytes within each ONU header portion 28 which comprise all zeros, all ones and alternating zeros and ones, and optionally the filler bytes 32 which are used after the last ONU data packet to complete each frame.

In accordance with aspects of the present invention, the transmit control store circuit 52 includes a byte counter 60 which generates successive numeric count values corresponding to each byte location within each frame 24. The count values are passed through a multiplexer 62 and are applied to address a control store memory 64 and an overhead data store memory 66. Both of the memories 64 and 66 are preferably implemented as dual port stores, or as shown in FIG. 4, time-divided single port stores. The control store memory 64 has byte positions corresponding to the total number of bytes comprising each frame 24. A preferred embodiment is to provide each frame with 256 bytes so that the memory 64 has at least 256 byte positions, so that for an 8 kHz frame rate of 4B5B coding a fiber transmission rate of 20.48 MHz results.

Basically, the control store memory 64 controls the format of the frame 24, while the overhead data store memory 66 contains preferred frame overhead bytes such as the packet ID bytes and generic communications data bytes associated with the ONU communications field 26. The filler field 32, packet clock acquisition bytes and communications field clock acquisition bytes can be provided by the memory 66 or by a byte generator associated with the encoder 54. The frame overhead data store memory 66 is most preferably of the same size and has the same addressing arrangement as the control store memory 64, and at a minimum has a number of byte positions equal to or greater than the number of bytes of the frame 24.

FIG. 3A provides a memory map example for the frame overhead data store memory 64 which corresponds with the FIG. 2 frame format example (but not the example actually represented by data and overhead byte positions shown in the control store memory 64 and the overhead store memory 66 shown in FIG. 3). In the FIG. 3A example, the communications field 26 is stored at the top of memory, and the ONU ID fields 28 are stored at locations related to the positions of those fields in the FIG. 2 format, for example. This arrangement has proven to be very effective and very economical in practice.

The byte positions of the control store memory 64 are used to control the outputting of user data bytes from the FIFO 44 through the gate 48, as well as to control the gate 50 and any byte generator optionally associated with the encoder 54. As the byte positions of each frame 24 are being counted, the control store memory 64 is switching between commanding user data bytes by outputting control values to the gate 48 for each user data byte to be obtained from the FIFO 44, such control values being illustrated in memory field 65 of the memory 64, and commanding appropriate frame overhead data bytes be outputted by the memory 66 or by an optional clock acquisition byte generator and filler byte generator associated with the encoder. Such overhead control instructions are illustrated in control store memory field 67.

A microcontroller 68 within the HDT 14 programs the control store memory 64 and the overhead story memory 66 so that appropriate user bytes in the FIFO 44 are correctly aligned with their appropriate destination ONUs ID bytes. The microcontroller 68 also enables the control store memory 64 and the overhead store memory 66 to be updated in real time. The microcontroller 68 includes an address/data bus 70, an address latch 71 and an address bus 72 extending through the multiplexer 62 to address the control store memory and the overhead memory 66. At the same time, data values supplied over the data bus 70 are passed through either a byte gate 74 leading to the control store memory 64, or through a byte gate 76 leading to the overhead memory 66, so that the microcontroller 68 may rewrite values stored in either one of the memories 64 or 66 thereby either to change the frame format, or to update information, such as the communications bytes in the communications field 26. In this manner, the memories 64 and 66 may readily be updated and reprogrammed in real time without any disruption of the network operation in order to make changes in ONU configurations as service subscriber needs change. As noted, communications from the HDT 14 to the ONUs 20 are readily carried out by writing communications bytes into the overhead memory 66 and then putting out the communications bytes 26 with each frame 24.

In order to achieve the equivalence of dual port memory with low cost single port semiconductor memory arrays, the control store memory 64 and frame overhead data memory 66 are clocked at a sufficiently rapid rate so that each frame byte clock period is divided into two phases: a write phase during which the microcontroller 68 may write new values into an address of either the control store memory 64 or overhead memory 66, and a read phase during which values from the control store memory 64 and overhead memory 66 are being read out to form the frame 24 in a presently desired configuration.

FIG. 4 illustrates a presently preferred specific circuit implementation of key elements of the transmit control store 52. The control store 64 and the frame overhead data store 66 are implemented as 8 bit by 512 bit static memory ICs, such as type 6116. This permits each memory 64, 66 to be arranged as two pages of 256 bytes per page. The TMA8 control line selects between the two pages of each memory array. Also, by providing two memory pages for each memory 64, 66, it is practical to completely reprogram the frame format during first phases of sequential byte clock periods, and then switching from the old page to the new page at the beginning of a frame time period, without any interruption in service.

An output latch 80 latches control values put out from the control store 64 including three lines 26 (TXCS0-2) which address a decoder 82. The decoder 82 puts out a number of control signals needed for generating the predetermined frame format, including check sums, user data, communications values (op-codes), ONU IDs, filler bytes, etc. The decoder 82 also puts out an LBEN control which enables the latch 50 which causes values contained in the overhead memory 66 to be put out to the bus 46. The latches 80 and 50 are clocked by a TXMUX control value which is put out during the transmit half of the two phase memory cycle when the memories 64 and 66 are being read and their stored values put out to the latches 80 and 50. The multiplexer 62, shown as two commonly controlled four bit multiplexers in FIG. 4, is also controlled by the TXMUX control signal.

The transmit byte counter 60 is preferably arranged as shown in FIG. 4 and comprises two four bit counters connected in tandem to provide 256 successive count values in response to a byte clock signal TBCLK. A TC2 control signal resets the counter 60 to zero at the beginning of a frame in the present example. The logic circuitry associated with the two four bit counters enables the counter to stop when the count of 256 is reached and is used to test, transmit, and receive functions of the HDT and ONUs prior to starting user service on the network so as to achieve a single one frame self test, and is not otherwise relevant to the present invention.

Accordingly, it is evident from the description of the invention that each byte to be obtained from the overhead data store memory 66 is stored in a sequential address location therein which equals a sequential location for that byte in the information frame, with this sequential location being identical to its corresponding sequential address value generated by the counter 60 which instructs the control store memory 64 to obtain the given byte from the overhead data store memory 66. For example, consider the case where a particular packet ID identifier byte is to be located in byte position 72 in an information frame. According to the invention, storage location 72 in the overhead data store memory 66 is programmed to contain this particular packet ID identifier byte, and storage location 72 in the control store memory is programmed to instruct the overhead data store memory to pass the byte through the gate 50 from its storage location 72 which corresponds to the current count of the byte counter. Accordingly, when the byte counter reaches the value of 72, upon inputting this count to the control store memory 64, the control store memory 64 outputs a corresponding control byte from the memory field 65 to the overhead data store memory 66 instructing the overhead data store memory 66 to pass its byte also located in storage location 72 through the gate 50. Since bytes are arranged in the overhead data store memory 66 at numeric locations which correspond to the numeric byte locations where they are to reside in the frame, a single byte counter 60 can be utilized for controlling both memories 64 and 66 which results in a reduced circuit implementation as opposed to utilizing an overhead data store memory 66 which contains all its bytes stacked sequentially next to each other and is addressed by a separate counter having a count delay which corresponds to a number of data bytes in the information frame which reside between bytes to be outputted by the overhead data store memory 66.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A method of forming and transmitting recurrent information frames from a host terminal to a plurality of network units so that the frames can programmably be reformatted from frame to frame so as to allow a number of packets contained therein to change and so as to allow a number of bytes contained within any packet to change, comprising the steps of:

storing user data bytes to be received by the network units in a user data buffer memory means;

storing packet ID identifiers for the network units in an overhead memory means at first address storage locations spaced apart within the overhead memory means so that each network unit packet identifier is stored in a storage location which numerically coincides with its corresponding numeric frame byte location where each packet identifier is to be located in the frame, the overhead memory means having a number of storage locations at least as large as a number of byte locations in the information frame;

storing a control pattern for sequentially controlling a format of the information frame in a control memory means such that the resultant information frame includes the user data bytes and the packet identifiers in a predetermined order, the control memory means having a number of addresses at least as large as a number of byte locations in the information frame;

generating and simultaneously applying sequential address values to the control memory means and the overhead memory means; and sequentially outputting control bytes from the control memory means in accordance with each sequential address value to control selective data output of the user data buffer memory means and the overhead memory means whereby each byte obtained from the overhead memory means is from a sequential address location corresponding to the sequential address value which generated its associated control byte so that a said network unit packet identifier and data bytes for said unit are arranged within each frame in accordance with the frame control pattern stored in the control memory means.

2. The method set forth in claim 1, wherein the control pattern in the control memory means is sequentially ordered and arranged so as to correspond with a sequential order of bytes in the frame such that when it is time for a packet data byte to be arranged in the frame one such data byte is obtained from the data buffer memory means and when it is time for a packet identifier to be arranged in the frame one such packet identifier byte is obtained from the overhead memory means from an address storage location which numerically corresponds to where such packet identifier byte is to be arranged in the frame.

3. The method set forth in claim 2, further comprising the step of storing generic communication data bytes in the overhead memory means at second address storage locations arranged within the overhead memory means so that each communication data byte is stored in a storage location which numerically corresponds with its corresponding numeric frame byte location where each communication data byte is to be located in the frame and its corresponding control byte.

4. The method set forth in claim 2, further comprising the step of obtaining frame filler bytes and packet clock acquisition bytes from a filler byte and clock acquisition byte generator in response to control bytes generated by the control memory means.

5. The method set forth in claim 4 wherein the step of generating and simultaneously applying address values to the control memory means and obtaining bytes from the overhead memory means is carried out by generating sequential byte count values with a single byte counter means; the overhead memory means, data buffer memory means, filler byte and clock acquisition byte generator all being controlled by output from the control memory means.

6. The method set forth in claim 5 wherein the frame comprises n bytes of information, and wherein the highest number of sequential address values used in the control memory means and the overhead memory means is n.

7. The method set forth in claim 1 wherein the packet identifiers comprise optical network unit identifiers which are generated by the host terminal which is connected to the optical network units via optical fiber, the host terminal comprising a digital terminal.

8. A host terminal for assembling recurrent packets within recurrent data frames of information for transmission over a network from the host terminal to a variable number of network units, wherein each frame contains a programmed number of network unit packets which can vary from frame to frame, wherein each packet has a variable byte length which can change from frame to frame related to an amount of bandwidth required by each network unit, comprising:

user data buffer storage means for storing user data bytes, control memory means for storing a control pattern for controlling a format of the frames, the control memory means having a number of addresses at least as large as a number of bytes in the information frame, overhead memory means for storing frame overhead information at predetermined storage locations therein, the overhead memory means having a number of addresses at least as large as a number of bytes in the information frame, at least some of the frame overhead information comprising packet ID identifiers which are stored at numeric address locations within the overhead memory means so as to be sequentially spaced apart and so as to numerically coincide with frame address locations where each such packet ID identifier is to be located in the frame, control byte counter means for generating and simultaneously applying sequential numeric address values to the control memory means and the overhead memory means, and decoding logic means for decoding control bytes put out by the control memory means to control selective data output of the user data buffer storage means and the overhead memory means whereby each byte obtained from the overhead memory means is from a sequential address location corresponding to the sequential address value which generated its associated control byte so as to construct frames in accordance with the control pattern stored in the control memory means.

9. The host terminal set forth in claim 8, the control pattern in the control memory means being sequentially ordered so as to numerically correspond with a sequential order of bytes in the frame such that when it is time for a user data byte to be arranged in the frame one such user data byte is obtained from the data buffer memory means and when it is time for a packet identifier to be arranged in the frame one such packet identifier byte is obtained from the overhead memory means from a storage location which numerically equals its corresponding sequential address value.

10. The host terminal set forth in claim 9, the overhead memory means including generic communication data bytes at locations spaced apart in the overhead means so that each communication data byte is stored in a numeric storage location which numerically corresponds with its corresponding numeric frame byte location where each communication date byte is to be located in the frame.

11. The host terminal set forth in claim 9, further comprising a filler byte and clock acquisition byte generator for generating frame filler bytes and packet clock acquisition bytes upon being instructed by control bytes put out by the control memory means.

12. The host terminal set forth in claim 8 wherein the overhead memory means has the same number of addresses as has the control memory means.

13. The host terminal set forth in claim 8 wherein the control memory means and the overhead memory means comprise semiconductor static random access memory arrays each arranged as a plurality of separately addressable pages, whereby one set of pages may be read while another set of pages is being written.

14. The host terminal set forth in claim 8 further comprising writing means for writing the control pattern in the control memory means, and for writing the overhead information in the overhead memory means.

15. The host terminal set forth in claim 14 wherein the writing means is capable of writing to a selected one of the control memory means and the overhead memory means between successive counts put out by the control byte counter means.

16. The host terminal set forth in claim 15 wherein the writing means includes a digital microcontroller means selectively connectable to write values to the control memory means and to the overhead memory means via an address bus for providing addresses and via a data bus for providing values to the control memory means and to the overhead memory means.

17. The host terminal means set forth in claim 16 further comprising address multiplexing means for selecting between the control byte counter means and the address bus of the microcontroller means.

18. The host terminal set forth in claim 8 wherein the control byte counter means comprises a counter arranged to put out sequential count values corresponding in number to the number of separate information bytes included within the frame.

* * * * *